April 27, 1937.  A. C. ZIMMERMAN  2,078,361
WATER SOFTENER
Filed April 2, 1934   6 Sheets-Sheet 2
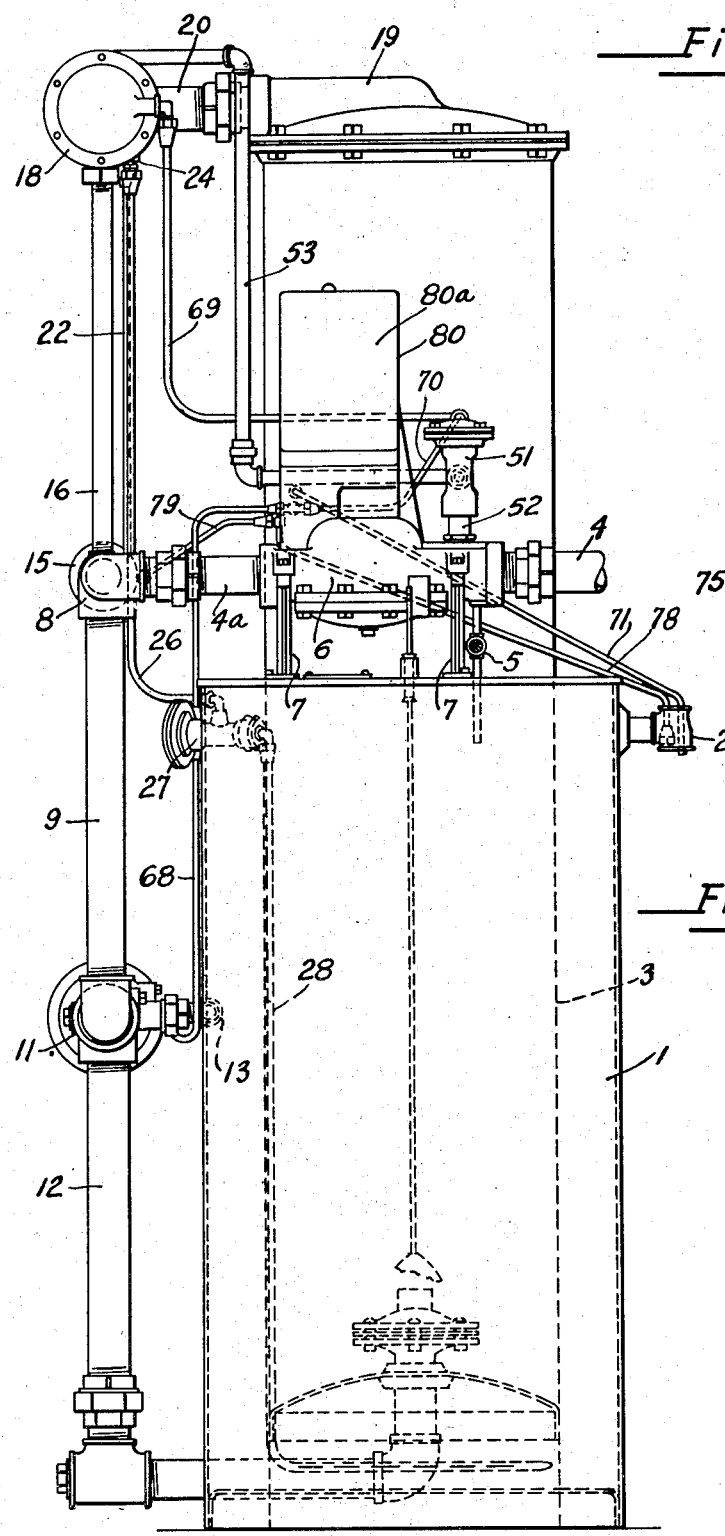
Fig.2.
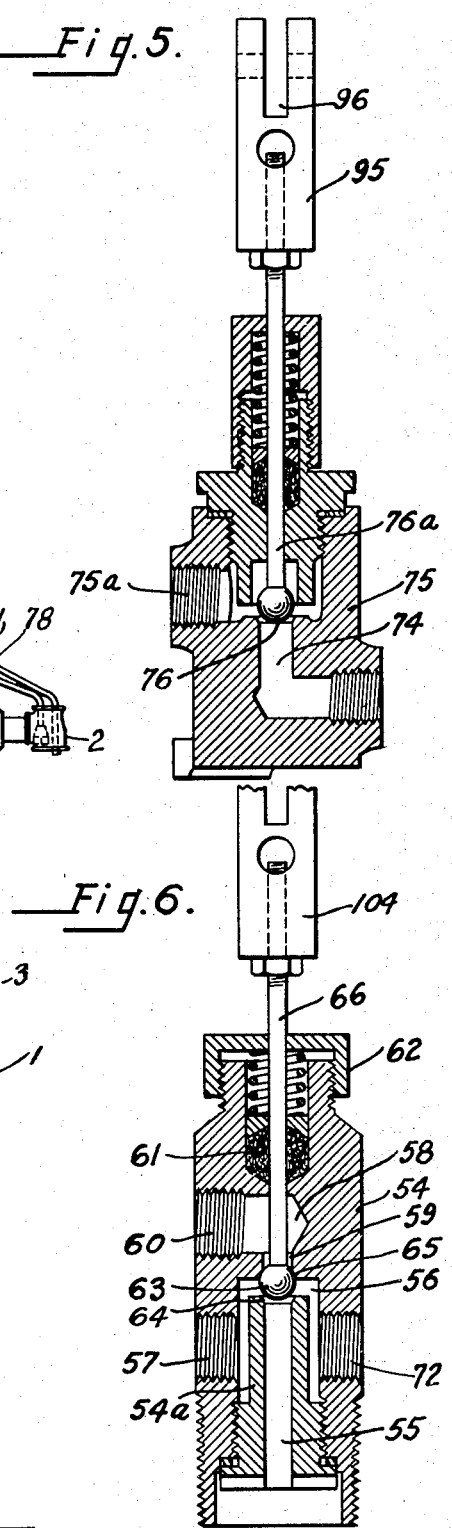
Fig.5.
Fig.6.
INVENTOR
ARTHUR C. ZIMMERMAN.
BY Toulmin & Toulmin
ATTORNEYS

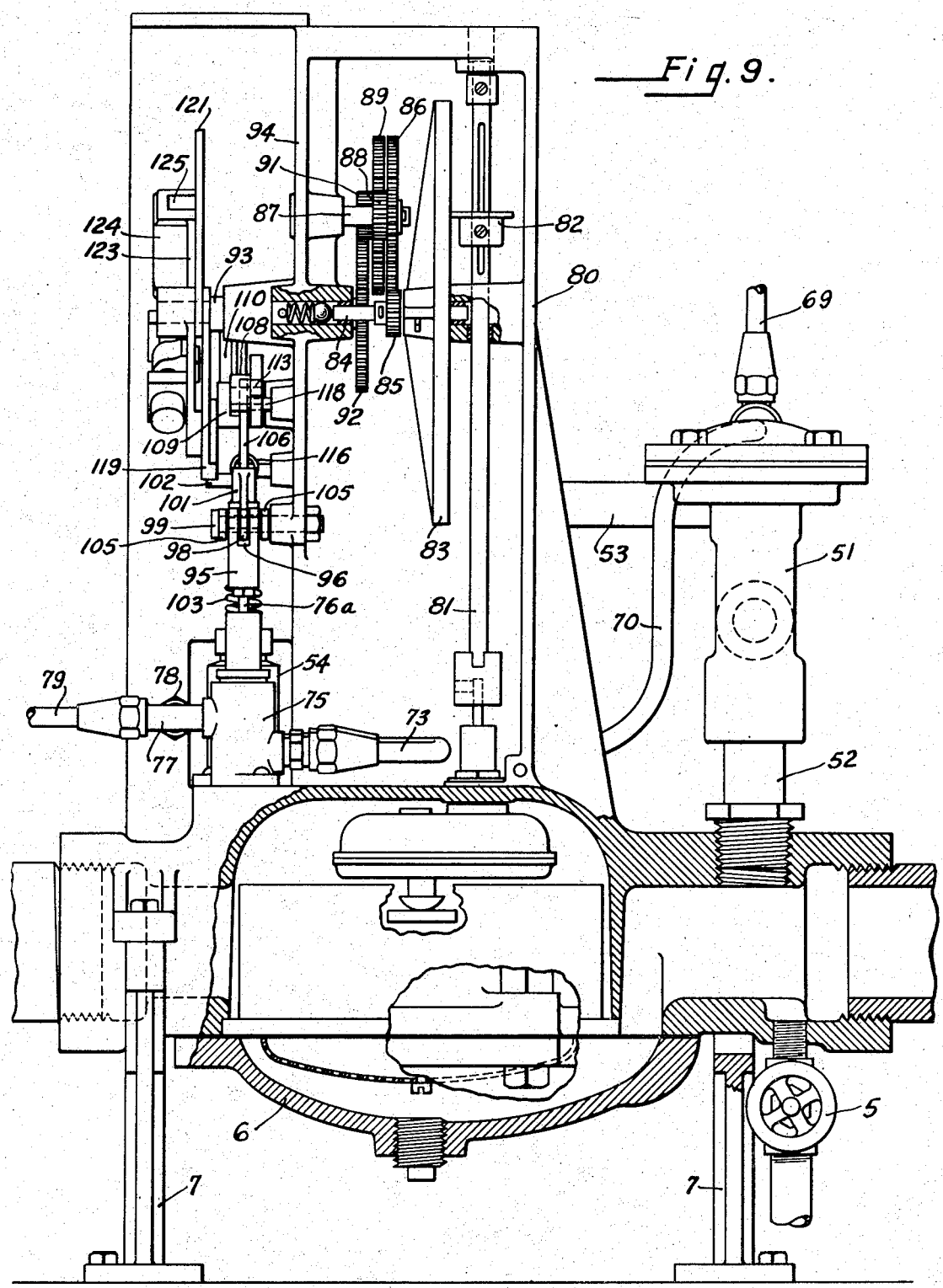

April 27, 1937.                A. C. ZIMMERMAN                2,078,361
                                 WATER SOFTENER
                          Filed April 2, 1934        6 Sheets—Sheet 6
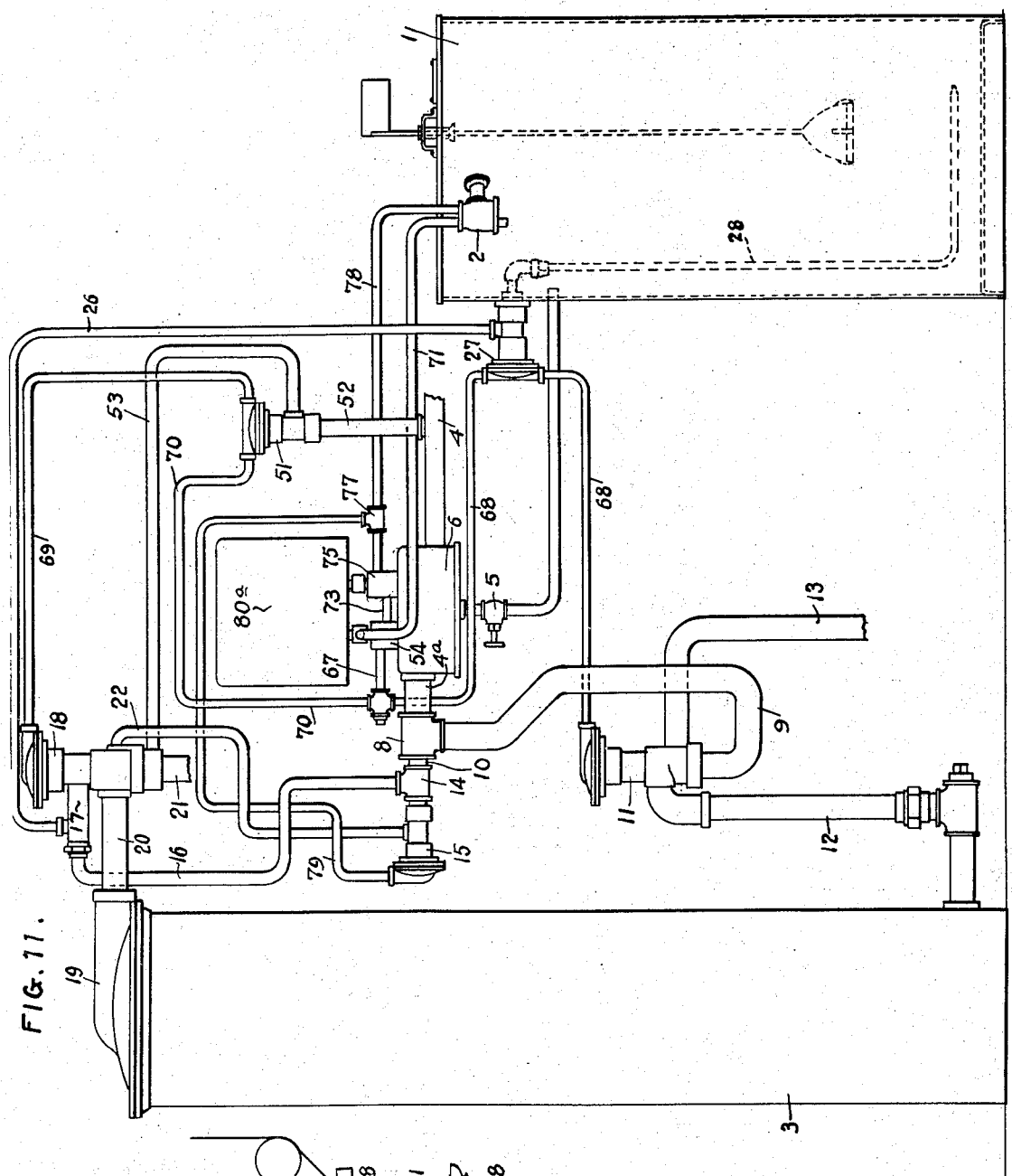
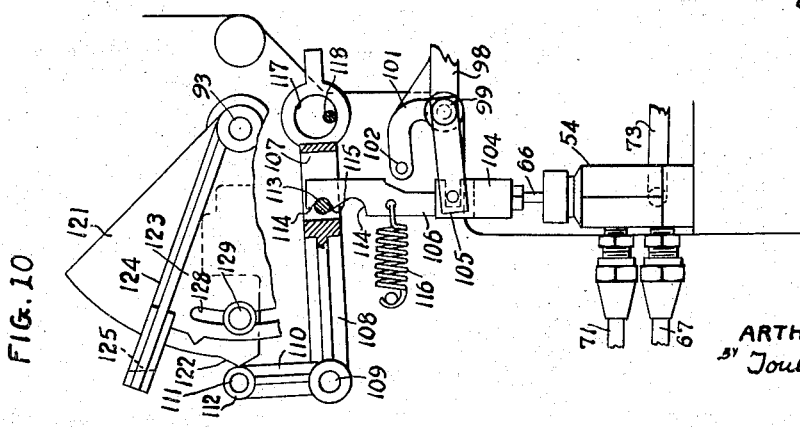
ARTHUR C. ZIMMERMAN,
BY Toulmin & Toulmin
Attorneys Patented Apr. 27, 1937

2,078,361

UNITED STATES PATENT OFFICE 2,078,361

WATER SOFTENER

Arthur C. Zimmerman, Dayton, Ohio, assignor to The Duro Company, Dayton, Ohio, a corporation of Ohio Application April 2, 1934, Serial No. 718,621

6 Claims. (Cl. 210—24)

This invention relates to improvements in water softeners, and has for its object to provide a water softener that is automatic in all respects and which may be adjusted to vary the regenerating period, the rinsing period and the refill period, the adjustable elements being operated by the flow of hard water to automatically terminate and start the various operating periods just mentioned.

It is also an object of this invention to provide, in connection with a water softener, means including a pair of valves for controlling the various time intervals in connection with a water softener, and adjustable means for operating the valves in succession to determine the length of the time periods.

These and other advantages will appear from the following description taken in connection with the drawings.

Referring to the drawings:

Figure 2 is a view taken from the righthand side of that shown in Figure 1.

Figure 3 is a section on the line 3—3 of Figure 4.

Figure 4 is a bottom plan view of the valve mechanism located on top of the softening tank.

Figure 5 is a section through the refill and rinse control valve.

Figure 6 is a section through the regenerating valve.

Figure 9 is a side elevation of the valve operating mechanism with parts of the housing therefor removed and parts broken away.

Figure 10 is a diagrammatic view comprising a vertical section through a portion of Figure 9, and showing the details of the pilot valve-operating mechanism.

Figure 11 is a diagrammatic layout view of the hydraulic circuit and elements of the water softening outfit shown in Figures 1 and 2.

Figure 1:
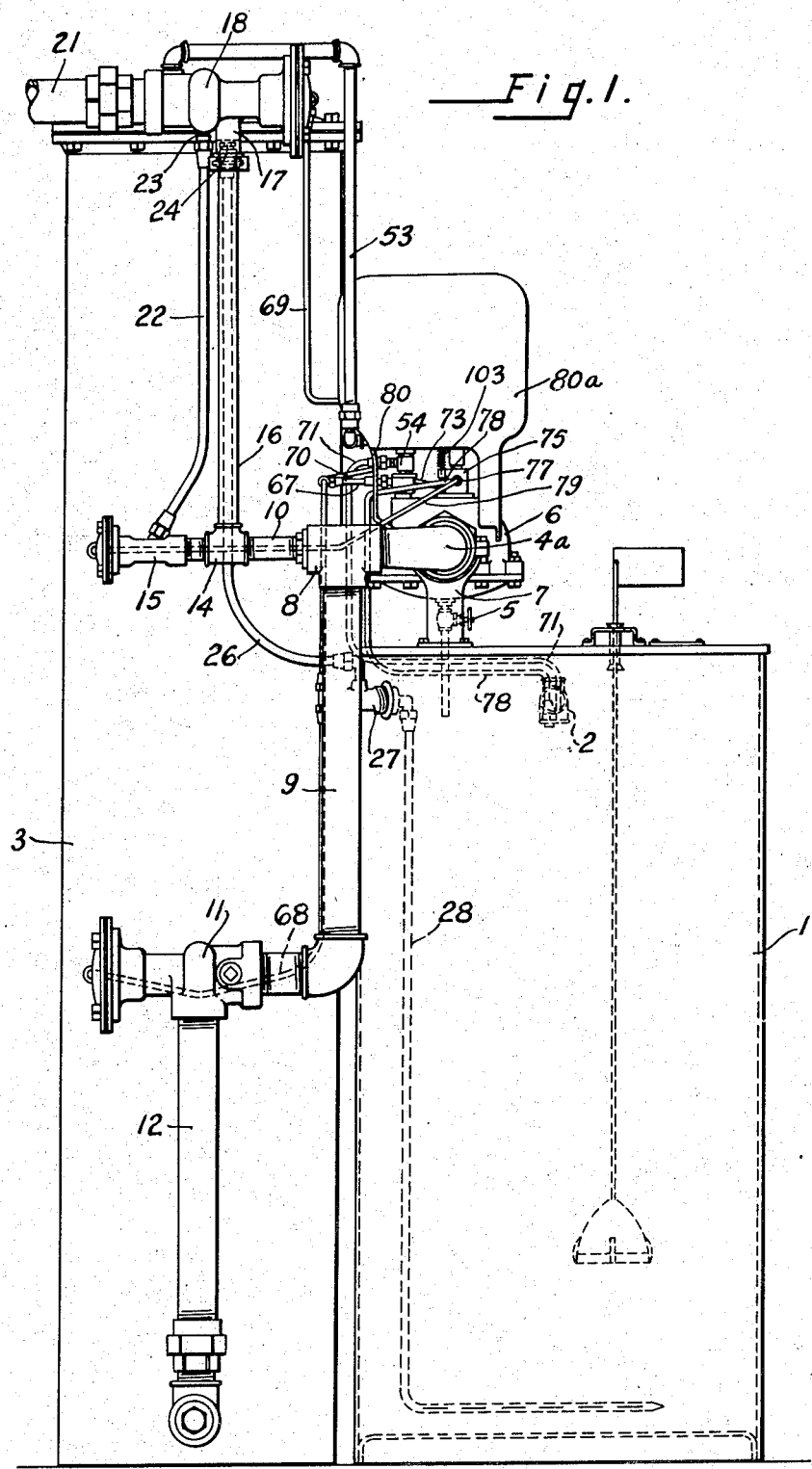
Figure 1 is an elevation showing the complete water softening outfit.

In the present water softener there is the usual brine tank 1 having an overflow pipe 2 and a softening tank 3, suitably connected to the brine tank. The water to be softened is supplied by a hard water pipe 4, which leads into a meter 6. Either the meter directly adjacent the hard water pipe or the pipe itself may be provided with a brine fill pipe and valve 5 for the purpose of supplying water to the brine tank in the event that the required amount is not automatically supplied.

The meter is supported on top of the brine tank by means of legs 7 suitably attached to the tank and to the meter. Extending from the meter, opposite the hard water pipe 4 (Figures 1 and 2), is a hard water pipe 4a, one end of which is connected to the meter casing and the other to a T-coupling 8. To this coupling there is attached one end of a downwardly extending hard water pipe 9 and one end of a horizontally extending pipe 10. The pipe 9 has its other end connected to a valve casing 11, to which one end of a pipe 12 is attached, with its other end connected to the bottom of the softening tank 3. The valve casing 11 is also provided with a waste water pipe 13.

To the other end of the pipe 10 is attached a T-coupling 14 to which a valve casing 15 is attached. This casing has the refill valve therein, operated by a refill control valve 75, later to be described. The T-connection 14 has attached thereto one end of an upwardly extending hard water pipe 16, the other end of which is attached to the valve casing 18 by means of an extension or pipe tap 17. The valve casing 18 is supported on top of the softening tank by means of suitable supports 19, and is connected to the top of the softening tank by means of a connection or pipe 20. This valve casing 18 has also attached thereto one end of a service or supply outlet pipe 21.

Extending from the valve casing 15 to an extension or tap 23 on the valve casing 18 is a hard water pipe 22. In the extension 17 of the valve 18 (Figures 3 and 4) there is an opening 25 provided with a hollow plug 24 connected by means of a brine pipe 26 to a valve casing 27. From this valve casing 27 extends a brine pipe 28, which terminates in the bottom of the brine tank for conducting the brine to the softening tank for regenerating purposes. The extension 17 of the valve 18 is hollow (Figure 3) and has therein an injector device. This injector device consists of a plug 29 with a small centrally arranged bore 30 through which the water passes from the hard water pipe 16 for regenerating purposes, and a second plug 31 in aligned spaced relationship with the plug 29, the second plug 31 having a Venturi passageway 32 leading into a chamber 33. From this chamber 33 extends a passageway 34 which terminates in a chamber 35 connected to the connection 20. It is through this chamber 35 that the water passes to and from the softening tank.

On each side of the chamber 35 is a valve seat, one 36 around the passageway 34, and the other 37 around the passageway leading from the chamber into the service pipe. Between these two seats is a valve member 38 adapted to close either the passageway 34 or the passageway leading from the chamber 35 to the service pipe. When the valve member 38 is in its lower position (Figure 3) against the valve seat 37, and the refill valve 15 is in its open position, hard water is admitted through the pipe 22 into the chambers 35 and 33 to overcome the injector action of the injector device and to cause refilling of the brine tank and washing of the softening tank. Extending upwardly from the valve member 38 is a stem 39, which has on top thereof a plate 40. This stem extends longitudinally through the valve casing 18 and has around it a packing 41 and a packing gland 42. Suitably threaded into the valve casing and around the valve stem is a cup 43, which has therein a spring 44 engaging both the cup and the gland so as to hold the gland and the packing in proper position to prevent leakage along the valve stem. Around the cup is a larger spring 45, which has one end engaging a shoulder on the interior of the valve casing, while its other end is in engagement with the plate 40.

The end of the valve casing 18 remote from the service pipe is flared out, as indicated by the numeral 46, and has attached thereto a cap 47, which has between it and the flared-out part 46 a diaphragm 48. These elements are connected by means of screws 49. The diaphragm and the cap form a pressure chamber 50, to which water under pressure is admitted for shifting the valve from one seat to the other. The spring 45 tends to hold the valve against the seat 36 so that water is normally passing from the softening tank out through the service pipe.

In order to provide water when regeneration is taking place there is provided in the pipe 4, or any part of the meter casing adjacent thereto, a pipe 52 (Figure 9) leading to a valve casing 51. This valve casing 51 is connected by means of a pipe 53 to the casing 18 or to the service pipe adjacent the casing. Threaded into the upper part of the meter casing is the regeneration control valve casing 54 (Figure 8) serving as a pilot or control valve and which has therein a plug 54a (Figure 6) forming a passageway 55 extending upwardly therethrough and terminating in a chamber 56. This chamber 56 is provided with a horizontally extending threaded opening 57. The part of the valve casing 54 above the chamber 48 forms a passageway 59 leading to a chamber 58.

From the chamber 58 is a laterally extending threaded opening 60 for the attachment of the drain pipe 71. The upper end of the valve casing 54 is provided with a cap 62, which has therein a hole through which the valve stem 66 passes. Around this stem is a packing 61, just beneath the cap. In the chamber 56 is a valve 63 adapted to engage a seat 64 for closing the passageway 55 or engaging a seat 65 for closing the passageway 59. The valve stem 66 extends upwardly from this valve and out through the top and beyond the cap.

A pipe 67 (Figures 1 and 8) has one end threaded in the opening 57 of the valve casing 54 and to a T at its other end are attached two branch pipes (Figure 7), one branch 68 leading to the valve casing 11, and another branch 70 leading to the valve casing 51, and continuing therebeyond in the line 69 leading to the valve casing 18. These pipes 68, 69 and 70 lead to pressure chambers for the purpose of providing pressure upon the diaphragm to operate valves within the casings 11, 18 and 51, respectively. These pressure chambers are similar to the pressure chamber shown in Figure 3 and designated 50. A drain pipe 71 has its open end connected to the threaded opening 60 and its other end connected to the overflow 2.

The chamber 56 has extending therefrom an outlet opening 72 into which is threaded one end of a pipe 73 extending into a chamber 74 of a pilot or control valve casing 75 (Figures 5 and 8) suitably supported on top of the meter adjacent the valve casing 54. The valve casing 54 forms the regeneration control valve casing. Within the valve casing 75 is a valve 76 from which there extends upwardly beyond the casing a valve stem 76a. To a hole 75a of this casing 75 is connected a T-connection 77. To this T-connection is attached one end of a bleed pipe 78, which has a restricted opening therein and terminates in the overflow 2. Also extending from this T-connection 77 is a pipe 79 to the valve casing 15 for operating the valve therein for rinsing and refilling purposes.

Figure 7:
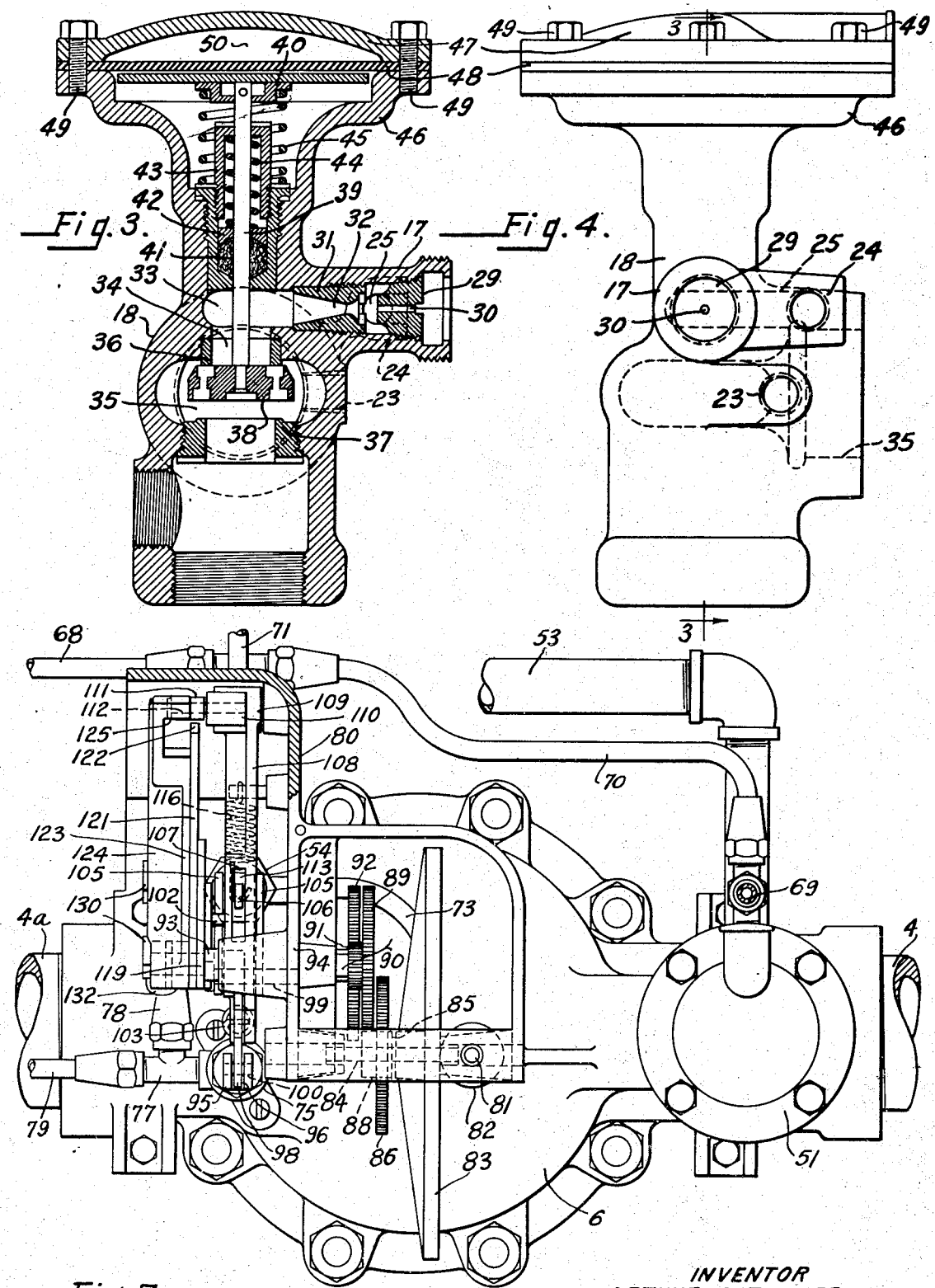
Figure 7 is a top plan view of the valve operating mechanism with parts of the housing therefor removed.
Figure 8:
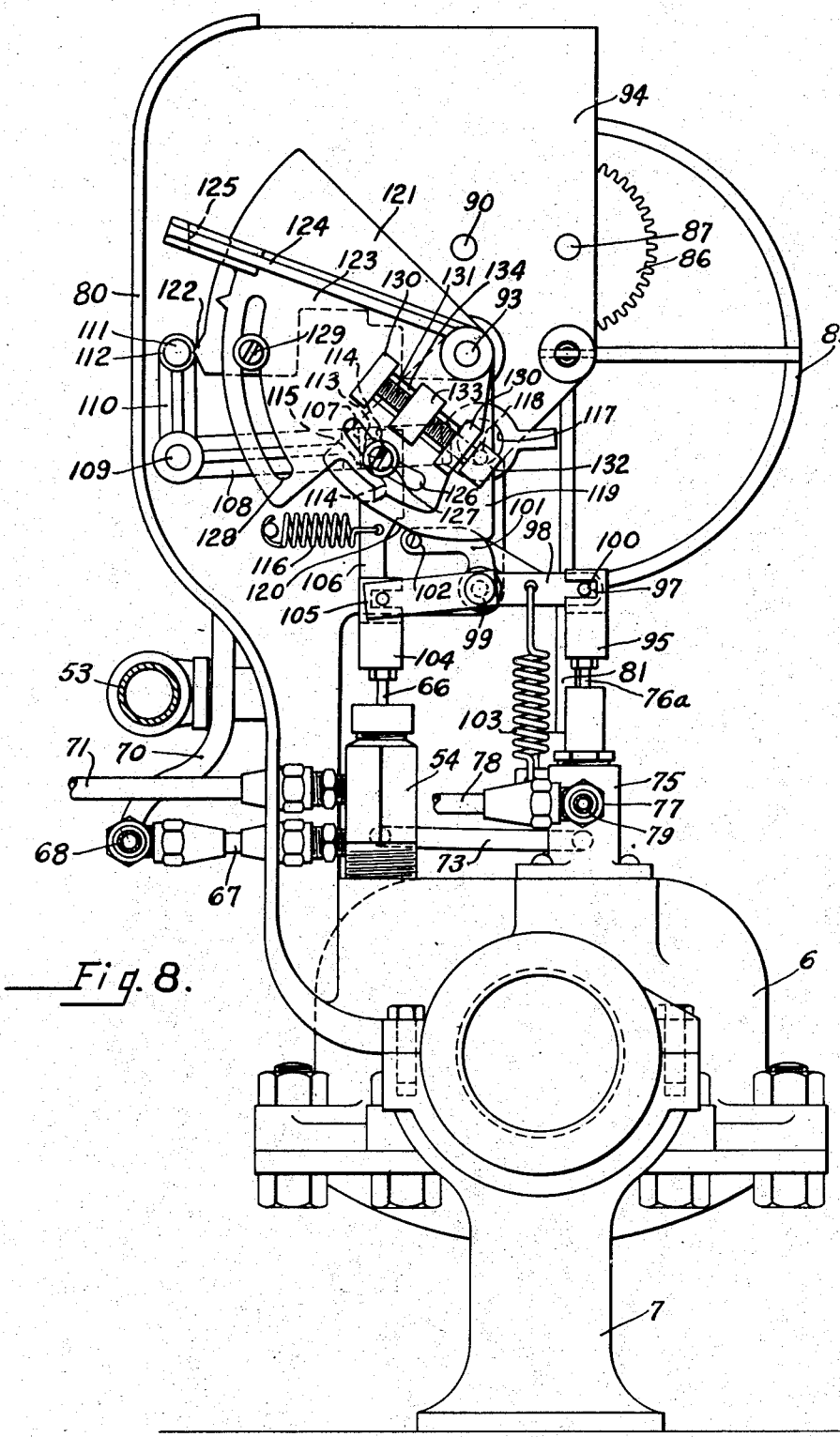
Figure 8 is a front of the valve operating mechanism with parts of the housing therefor removed.

On top of the meter is a casing 80 provided with a removable closure 80a (Figures 7, 8 and 9). Extending upwardly from the interior of the meter is a meter shaft 81, which has thereon an adjustable disc 82 which engages a large vertically disposed disc 83 mounted upon a shaft 84 rotatably supported by the housing structure. On this shaft 84 is a pinion 85 in mesh with a gear 86 upon a shaft 87. This shaft has thereon a pinion 88 in mesh with a gear 89 on a shaft 90. This shaft 90 also has thereon a pinion 91 which is in mesh with a gear 92 on a shaft 93. All of these shafts are supported in suitable bearings in the housing or partition formed therein.

The shaft 93 has in one of its bearings a boss upon a partition wall 94. On the upper end of the valve stem 76a is a head 95 (Figures 5 and 9), which has in its top a slot 96 which divides the upper end of this shaft into two prongs. Across these prongs is a horizontally disposed slot 97. In the slot 96 is one end of a lever 98 pivoted at its other end to a bolt 99. The end of the lever within the slot 96 has extending therethrough a pin 100 (Figure 8), which engages in the slot 97 for moving the valve 76 and the valve stem 76a up and down.

This lever 98 has extending from its pivoted end an upwardly and longitudinally disposed arm 101 which has in its free end a pin 102. A spring 103 is attached at one end to the lever 98 and at its other end to a lug on the valve casing 75. On top of the valve stem 66 is a head 104, which has connected thereto one end of each of a pair of links 105. The other ends of these links are connected to the bolt 99 which forms the pivot of the lever 98.

In a slot provided in the head 104 is pivoted one end of a trip member 106 (Figures 7 and 8), which extends upwardly and through a slot 107 in an arm 108 of a bellcrank lever pivoted at 109 on the housing. The other arm 110 of this lever, which extends upwardly from the pivot, has thereon a lateral projection 111 provided with a roller 112. Extending through the arm 108 at one end of the slot 107 is a pin 113 (Figure 7) adapted to engage the upper and lower edges of an approximately V-shaped projection or shoulder 115 formed between a pair of adjacent notches 114 in the left-hand edge of the trip member 106.

The upper and lower edges of the V-shaped projection or shoulder 115 thus act as oppositely disposed cam surfaces adapted to engage the pin 113. When the lower edge of the projection 115 engages the pin 113 on the arm 108, it is pulled toward the pin 113 by the spring 116, thereby moving the trip member 106 upward and with it the valve stem 66, opening the valve in the casing 54. Similarly, when the upper edge of the projection 115 engages the pin 113, the spring 116 and the cam-like action of this edge cause the trip member 106 to be moved downward, closing the valve in the casing 54.

In the arm 108 is a hole 117 to receive a stop pin 118 located on the partition. This stop pin 118 serves to limit the upward and downward swinging movements of the arm 108 of the bell-crank lever. Mounted upon the shaft 93 and without the partition is a cam segment 119, which has thereon a cam surface 120 adapted to engage the pin 102. There is also mounted on the shaft 93 a second cam segment 121, which has thereon a cam 122 for engaging the roller 112 on the arm 110. There is also provided on the shaft 93 a third cam segment 123, which has on one edge thereof a rib 124 provided with a cam surface 125 to engage the roller 112.

These various cam segments may be adjusted with relation to one another. The cam segment 123 is provided with an arcuate slot 126 through which a screw 127 passes into the cam segment 119 for the purpose of holding the cam segment 123 in adjustment with relation to the cam segment 119. The cam segment 123 is provided with an arcuate slot 128, which has extending therethrough into the cam segment 121 a screw 129 for holding the cam segment 123 in adjustment with relation to the cam segment 121.

The cam segment 123 has thereon a pair of lugs 130 which support a screw 131 for rotation. This screw has at one end a head 132 and has thereon intermediate the lugs a projection 133, which extends through a slot 134 in the cam segment 123 and is attached to the cam segment 119. This screw in cooperation with the projection is for the purpose of providing a fine adjustment between the cam segment 123 and the cam segment 119.

In the operation of the water softening apparatus of this invention, the water from the pipe 4 causes the meter shaft 93 to rotate in a clockwise direction. As the shaft 93 rotates the cam surface 125 on the rib 124 engages the roller 112 to force the arm 110 inward (Figure 8) and thus bring the arm 108 to its lowest position with the pin 118 in the hole 117 thereof engaging the top edge of the hole. In this position the pin 113 is forced downward over the ridge of the projection 115 to engage the lower edge thereof. The spring 116 then pulls this lower edge against the pin 113, causing its cam-like action to raise the trip member 106 and valve stem 66, thus opening the regeneration control valve 54 so that water under pressure is applied to the various valves for regenerating purposes.

As the shaft 93 continues to rotate the cam surface 120 engages the pin 102, forcing the arm 101 downward so as to raise the valve stem 76a. This opens the valve 76 so that water under pressure will pass to the rinsing and refill valve casing 15 to operate the valve therein to direct the hard water through the pipe 22 for the purpose of putting a stop to regeneration and bringing about rinsing and refilling. As the shaft 93 continues to rotate, the cam surface 122 engages the roller 112, forcing the arm 110 outward. This moves the arm 108 upward against the stop pin 118, causing the pin 113 to ride upward over the ridge of the projection 115 so as to engage the upper cam edge thereof. The spring 116 then draws the stop arm 106 to the left and downward, closing the regeneration control valve 54 operated by the stem 66. This shuts off the water under pressure which operates the various valves, causing regeneration. The cam surface 120 engages the pin 102 to open the valve 76 sometime between the time that the cam surface 125 has engaged the roller 112 to open the regeneration control valve 54 and the time that the cam 122 engages the roller 112 to close the valve 54. The relative time intervals for these cam engagements may be varied by properly adjusting the segments with relation to one another.

After the cam 122 has engaged and passed beyond the roller 112 the valve 63 on the stem 66 is closed so that rinsing, refilling and regeneration are stopped and softening takes place. After the cam 122 has engaged the roller 112 the valve 76 remains open until the segment 119 passes beyond the pin 102. However, the valve 76 being open does not interfere with the softening since pressure has been cut off from the valve 76 by the closing of the valve 54 operated by the stem 66.

The various segments may be so adjusted that the quantity of water supplied for refilling is equal to the brine used for regeneration. It is preferable to adjust the segments so that the quantity of water supplied for refilling purposes is less than the brine used for regeneration so that after a series of regenerations the level of the brine in the tank is sufficiently low to permit of a new supply of salt being placed in the tank without the tank running over. It is desirable that the level of the brine in the brine tank be lower by about one or two inches after each regeneration and refill than it was before. The segments may be adjusted according to changes in the speed of rotation of the disc 83 due to the adjustment of the disc 82 on the meter shaft.

It will be understood that I desire to comprehend within my invention such modifications as come within the scope of my claims and my invention.

Having thus fully described my invention, what I claim as new and desire to secure by Letters Patent, is:

1. In a water softener, a softening tank, a brine tank and a source of hard water, a valve casing having a service outlet and a connection with the softening tank, with the brine tank and with the source of hard water, means to cause brine to flow from said brine tank to said valve casing, a second valve casing having a drain outlet and a connection with the softening tank and with the source of hard water, a valve in each casing having hydraulic shifting means associated therewith, a pair of pilot valves operatively responsive to the flow of the hard water and hydraulically connected to shift the valves in the casings, one of said pilot valves being arranged to shift said valves for softening and regenerating purposes, a valve having hydraulic shifting means connected to supply hard water to render said brine flow causing means inoperative so as to cut short the period of regeneration and to rinse the regenerating tank and refill the brine tank, said last-named valve being connected to supply water independently of and in opposition to the effect produced by the first-named hard-water-operated valve, the other pilot valve being arranged to shift said last-named valve to stop the regeneration and to refill and rinse.

2. In a water softener, a softening tank, a brine tank and a source of hard water, a valve casing having a service outlet and a connection with the softening tank, with the brine tank and with the source of hard water, means to cause brine to flow from said brine tank to said valve casing, a second valve casing having a drain outlet and a connection with the softening tank and with the source of hard water, a third valve casing having connection with the first-named valve casing and with the source of hard water, a valve in each valve casing having hydraulic shifting means associated therewith, a pilot valve operatively responsive to the flow of the hard water and connected to admit hard water to the hydraulic shifting means of said first two named valve casings to move the valves therein for regeneration, and a second pilot valve operatively responsive to the flow of the hard water to admit hard water to the hydraulic shifting means of said last-named valve casing to operate the valve therein to direct water to halt the operation of said brine flow causing means so as to stop the regeneration and to rinse the softening tank and refill the brine tank.

3. In a water softener, a softening tank, a brine tank and a source of hard water, a valve casing having a service outlet and a connection with the softening tank, with the brine tank and with the source of hard water, suction-producing means to cause brine to flow from said brine tank to said valve casing, a second valve casing having a drain outlet and a connection with the softening tank and with the source of hard water, a third valve casing having connection with the first-named valve casing and with the source of hard water, a valve in each valve casing having hydraulic shifting means associated therewith, a pilot valve operatively responsive to the flow of the hard water and connected to admit hard water to the hydraulic shifting means of said first two named valve casings to move the valves therein for regeneration, and a second pilot valve operatively responsive to the flow of the hard water and connected to admit hard water to the hydraulic shifting means of said last-named valve casing to operate the valve therein to direct water to overcome the suction of said suction-producing means to halt the flow of brine so as to stop the regeneration and to rinse the softening tank and refill the brine tank, and means to adjust the sequence of operation of the hard water operated valves.

4. In a water softener, a softening tank and a brine tank, an injector means connected to the brine tank and to the softening tank, a hard water source having a connection arranged to operate the injector means, whereby brine is drawn from the brine tank into the softening tank, a second connection from the hard water source adapted to furnish water to the injector means to counteract the injector action thereof and to refill the brine tank and wash the softening tank, and means operated by the flow of the hard water to open said second connection.

5. In a water softener, a softening tank and a brine tank, an injector means connected to the brine tank and the softening tank, a hard water source having a connection arranged to operate the injector, whereby brine is drawn from the brine tank into the softening tank, an auxiliary hard water pipe adapted to furnish water to the injector means to overcome the injector action thereof and refill the brine tank and wash the softening tank, a valve in the auxiliary pipe, and means operated by the flow of the hard water to move the valve to open said auxiliary pipe.

6. In a water softener, a softening tank having a service outlet and a drain outlet, a brine tank connected to the softening tank, a source of hard water, a valve assembly arranged in one position to direct the hard water through the softening tank to the service outlet and in another position to direct brine from the brine tank through the softening tank to the drain outlet, valve means actuated by the flow of the hard water and hydraulically connected to said valve assembly to apply hard water to shift said valve assembly, said flow-actuated means including a pair of valves, a cam arranged to open one valve and a cam arranged to close the same valve, means to rotatably support said cams, a flow-operated device to rotate said cams, and a third cam arranged to operate the other valve to rinse the softening tank and refill the brine tank.

ARTHUR C. ZIMMERMAN.